(12) United States Patent
Kowa et al.

(10) Patent No.: US 9,059,615 B2
(45) Date of Patent: Jun. 16, 2015

(54) MOTOR AND ELECTRIC APPARATUS EQUIPPED WITH SAME

(71) Applicant: Panasonic Corporation, Kadoma-shi, Osaka (JP)

(72) Inventors: Takeshi Kowa, Osaka (JP); Hiroaki Kawasaki, Osaka (JP); Akihiko Watanabe, Osaka (JP); Tatsuo Maetani, Hyogo (JP); Yoshinori Isomura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 281 days.

(21) Appl. No.: 13/866,813

(22) Filed: Apr. 19, 2013

(65) Prior Publication Data

US 2014/0015363 A1  Jan. 16, 2014

(30) Foreign Application Priority Data

Jul. 11, 2012  (JP) .................................. 2012-155305

(51) Int. Cl.
| | |
|---|---|
| H02K 5/16 | (2006.01) |
| H02K 1/30 | (2006.01) |
| H02K 5/173 | (2006.01) |
| H02K 11/00 | (2006.01) |
| H02K 1/04 | (2006.01) |

(52) U.S. Cl.
CPC .. *H02K 5/16* (2013.01); *H02K 1/04* (2013.01); *H02K 1/30* (2013.01); *H02K 5/1732* (2013.01); *H02K 11/0089* (2013.01)

(58) Field of Classification Search
USPC ........ 310/43, 51, 90, 156.01, 156.08–156.14, 310/156.21, 156.23, 216.116–216.131
See application file for complete search history.

(56) References Cited

U.S. PATENT DOCUMENTS

| | | | | |
|---|---|---|---|---|
| 5,157,297 | A | * | 10/1992 | Uchida .................... 310/156.61 |
| 5,704,111 | A | * | 1/1998 | Johnson et al. ................. 29/598 |
| 5,986,374 | A | * | 11/1999 | Kawakami ............... 310/156.13 |
| 6,166,468 | A | * | 12/2000 | Suzuki et al. .................... 310/90 |
| 2002/0047397 | A1 | * | 4/2002 | Osawa et al. .................... 310/90 |
| 2011/0043071 | A1 | * | 2/2011 | Mizukami et al. ..... 310/216.121 |
| 2013/0043748 | A1 | * | 2/2013 | Mizukami et al. .............. 310/71 |

FOREIGN PATENT DOCUMENTS

WO   WO 2009/113311 A1   9/2009

* cited by examiner

*Primary Examiner* — Thanh Lam

(74) *Attorney, Agent, or Firm* — Brinks Gilson & Lione

(57) ABSTRACT

A motor of the invention has a rotary body of a rotor, and the rotary body includes an outer core constituting an outer portion of the rotary body, an inner core constituting an inner portion connected to a shaft, and a dielectric layer disposed between the outer core and the inner core. The outer core has a protruding portion that protrudes inward from an inner surface thereof, and the inner core has a protruding portion that protrudes outward from an outer surface thereof, wherein the outer core and the inner core are so disposed that an end face of the protruding portion of the outer core and an end face of the protruding portion of the inner core confront partially with respect to each other.

8 Claims, 4 Drawing Sheets

MOTOR AND ELECTRIC APPARATUS EQUIPPED WITH SAME

RELATED APPLICATIONS

This application claims priority under 35 U.S.C. §119 to Japanese Patent Application No. 2012-155305 filed on Jul. 11, 2012, the entire content of which is hereby incorporated by reference.

TECHNICAL FIELD

The present invention relates to a motor and an electric apparatus equipped with the same, and more particularly, to a motor with improvements to suppress development of electrolytic corrosion of a bearing, and an electric apparatus equipped with the same.

BACKGROUND ART

There is a continuous increase in number of cases in which electric motors are driven by using inverters of pulse-width modulation method (hereinafter referred to as "PWM method"). In such a case where a motor is driven with an inverter of the PWM method, a difference in electric potential occurs between an outer ring and an inner ring of a bearing (referred to as "shaft voltage") since an electric potential at a neutral point of a winding does not stay at 0 (zero) volt. The shaft voltage includes a high-frequency component attributable to switching operation, and micro electric current flows inside the bearing when the shaft voltage reaches a breakdown voltage of an oil film inside the bearing, thereby causing electrolytic corrosion in the bearing. When the electrolytic corrosion progresses, a phenomenon of wavy wear appears on the outer ring, inner ring or balls of the bearing, thereby leading to abnormal sound noise which becomes one of the main causes of troubles of the motor.

A number of techniques have hitherto been proposed to suppress the electrolytic corrosion for the purpose of avoiding such troubles. In an example of International Publication No. 2009/113311, electrolytic corrosion is suppressed by decreasing the shaft voltage with a dielectric layer provided in a rotor.

In conventional techniques like the above example, however, there is a limitation in setting the shaft voltage appropriately though it has an effect of reducing a high frequency voltage induced in an inner ring of the bearing by making use of an electrostatic capacitance of the dielectric layer.

In other words, the shaft voltage can be set appropriately if the electrostatic capacitance provided by the dielectric layer is freely changeable. Such a change in the electrostatic capacitance is possible by changing a dielectric constant of an insulation resin that forms the dielectric layer, changing a thickness of the insulation resin, or changing an area between both cores. However, sizes of motors used in electric apparatuses are normally determined according to individual types of the electric apparatuses, and sizes of their rotors are generally standardized such that it is difficult to substantially alter the sizes, or to change the shape of dielectric layers in a flexible manner. Although a resin material and the like need to be changed in order to change a dielectric constant of the insulation resin that forms the dielectric layer, it is not easy to make any change in the material since such a change makes it necessary to confirm other points such as the strength. The conventional technique thus has a limitation in setting the dielectric layer in a manner to make the shaft voltage become optimum.

SUMMARY OF THE INVENTION

A motor of the present invention comprises a stator including a stator core wound with a winding, a rotor including a rotary body retaining a permanent magnet in a circumferential direction confronting the stator and a shaft connected to the rotary body in a position penetrating through the center of the rotary body, a bearing supporting the shaft rotatably, and a bracket. The rotary body of this motor has an outer core constituting an outer portion of the rotary body, an inner core constituting an inner portion connected to the shaft, and a dielectric layer disposed between the outer core and the inner core. The outer core has at least one protruding portion that protrudes inward from an inner surface thereof, and the inner core has at least one protruding portion that protrudes outward from an outer surface thereof. The outer core and the inner core are so disposed that an end face of the protruding portion of the outer core and an end face of the protruding portion of the inner core confront partially with respect to each other.

An electrostatic capacitance between the outer core and the inner core can be changed easily according to the above structure, and to readily achieve the structure capable of maintaining an appropriate shaft voltage. Since the motor of the present invention and an electric apparatus equipped with the same motor can readily achieve the structure of maintaining the appropriate shaft voltage, thus provided are the motor capable of effectively suppressing the development of electrolytic corrosion and the electric apparatus equipped with the same motor.

DETAILED DESCRIPTION OF THE PREFERRED EMBODIMENTS

Description will be provided hereinafter of a motor and an electric apparatus equipped with the motor according to the present invention by referring to the accompanying drawings.

First Exemplary Embodiments

Figure 1:
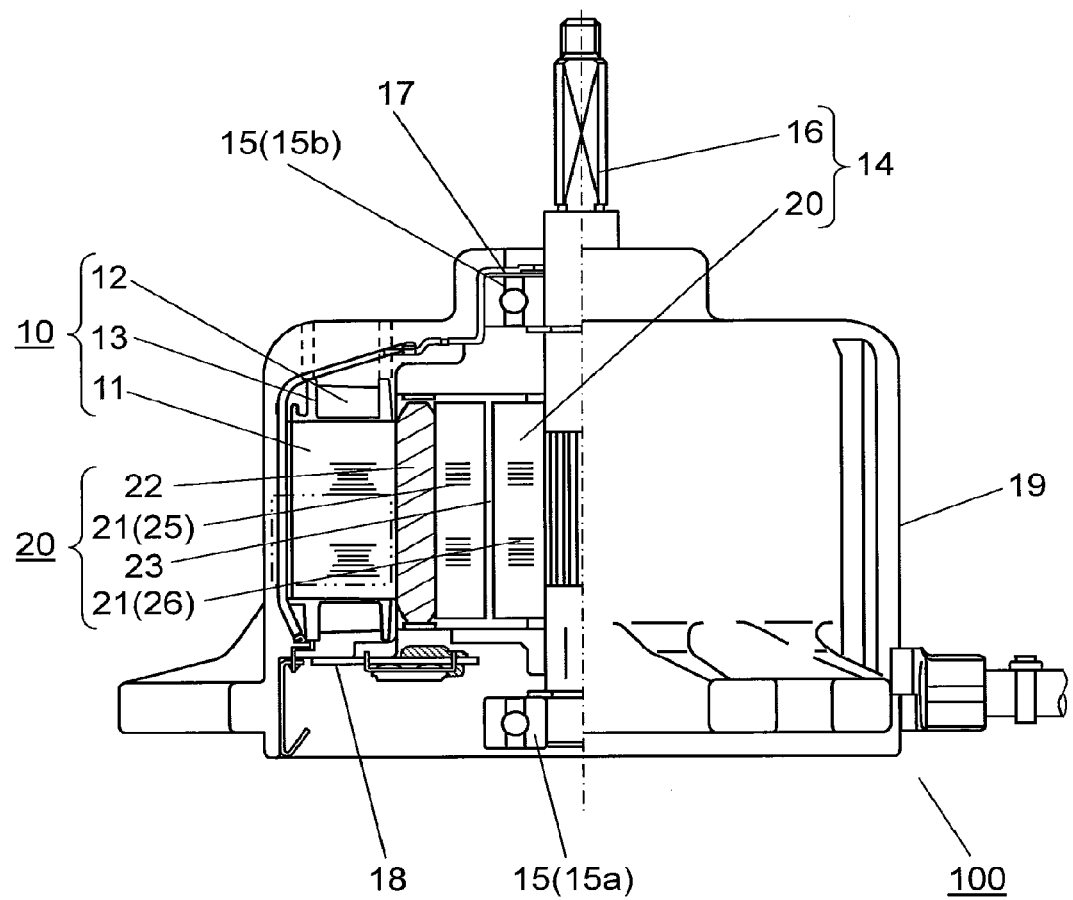
FIG. 1 is a structural drawing showing a cross section of a brushless motor according to first exemplary embodiment of the present invention.

FIG. 1 is a structural drawing showing a cross section of brushless motor 100 according to the first exemplary embodiment of this invention. In this embodiment, description is given of one example of brushless motor as a representative of the motor adaptable for mounting to an electric apparatus. In addition, the example described in this embodiment is an inner-rotor type motor having a rotor disposed rotatably to the interior side of a stator.

In FIG. 1, stator winding 12 is wound on iron stator core 11 with insulation resin 13 interposed as an insulator for isolating stator core 11. Stator core 11 of this structure is fixed into motor case 19 together with other stationary members, and composes stator 10 having an outer appearance of generally a cylindrical shape. Stator 10 may have such a structure as to be molded with an insulation resin, for instance, as a molding material.

Rotor 14 is inserted inside stator 10 with an air gap between them. Rotor 14 includes rotary body 20 of a cylindrical or disc-like shape having metallic rotor core 21, and shaft 16 connected to rotary body 20 in a position penetrating through the center of rotary body 20. Rotary body 20 retains magnet 22, which is a permanent magnet such as a ferrite resin magnet, in a circumferential direction confronting an inner peripheral side of the stator 10. Rotary body 20 has a structure consisting of iron outer core 25, dielectric layer 23 and iron inner core 26 arranged in this order from magnet 22 at the outermost side toward shaft 16 at the interior side, as shown in FIG. 1, of which details are described as follows. Here, outer core 25 composes an outer portion of rotor core 21, and inner core 26 composes an inner portion of rotor core 21. The structure shown in FIG. 1 is an example wherein rotor core 21, dielectric layer 23 and magnet 22 are molded integrally as rotary body 20. As illustrated, rotary body 20 is so disposed that an outer peripheral side of it confronts the inner peripheral side of stator 10.

Two bearings 15 are mounted to shaft 16 of rotor 14 to support shaft 16. Bearings 15 are a type having a plurality of steel balls. One of two bearings 15 is fixed to the molding resin, for instance, and the other is fixed to metallic bracket 17. According to the above structure, shaft 16 is supported by two bearings 15 to keep rotor 14 freely rotatable.

This brushless motor 100 further includes printed circuit board 18 built inside motor case 19, wherein printed circuit board 18 carries a drive circuit mounted thereto. Printed circuit board 18 is connected with connecting wires such as lead wires for delivering a power supply voltage to the winding, a power supply voltage to a control circuit and a control voltage for controlling a rotational speed, and a grounding wire of the control circuit.

The power supply voltages and a control signal are supplied through the connecting wires to brushless motor 100 constructed as above, and stator winding 12 is hence energized by the driving circuit on printed circuit board 18. When stator winding 12 is energized, a driving current flows through stator winding 12 thereby generating a magnetic field from stator core 11. The magnetic field from stator core 11 and a magnetic field from magnet 22 of rotor 14 produce attractive force and repulsive force depending on polarities of these magnetic fields, and these forces cause rotor 14 to rotate about shaft 16.

Figure 2:
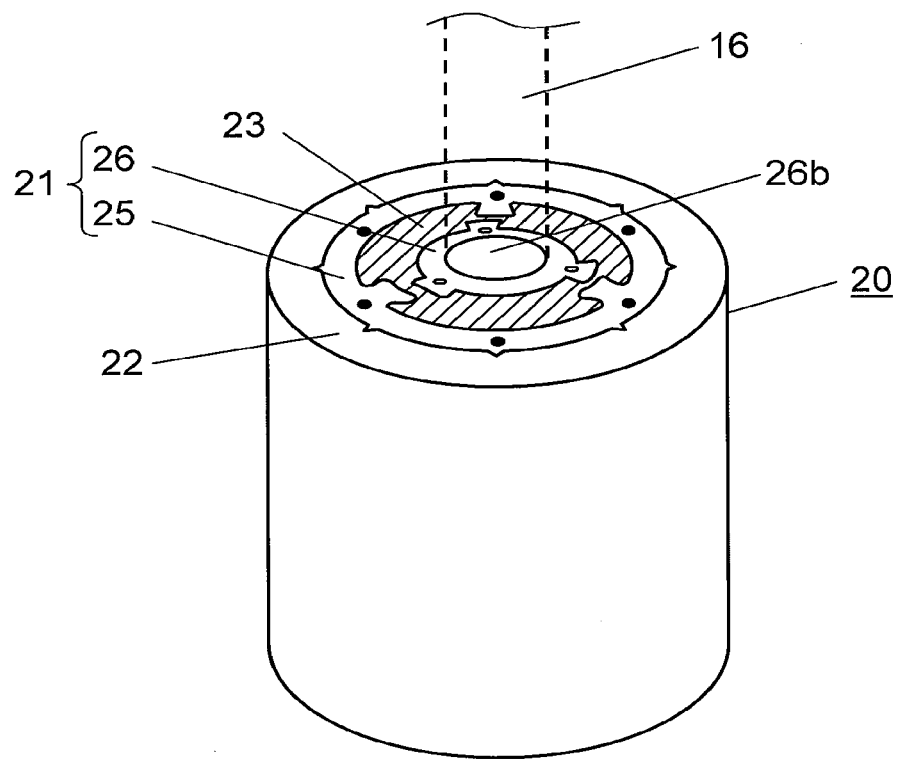
FIG. 2 is a schematic drawing of a rotary body according to the first exemplary embodiment of the present invention.

Description is provided next about general configuration of rotary body 20 inside brushless motor 100 constructed as discussed above. FIG. 2 is a schematic drawing of rotary body 20 according to the first embodiment of this invention. As shown in FIG. 2, rotary body 20 has magnet 22 disposed on the outermost side, and iron outer core 25 constituting rotor core 21, dielectric layer 23 and iron inner core 26 constituting rotor core 21 disposed in this order toward the interior side. Dielectric layer 23 is a layer formed of an insulation resin. In this embodiment, dielectric layer 23 of this configuration is disposed for suppression of electrolytic corrosion. Rotary body 20 has an integrally-formed structure as shown, which includes magnet 22, outer core 25, the insulation resin that forms dielectric layer 23, and inner core 26. In addition, inner core 26 has shaft insertion hole 26b formed in the inner periphery for connection of shaft 16 inserted therein. Rotor 14 to be supported by bearings 15 is constructed when shaft 16 is inserted in this shaft insertion hole 26b.

Dielectric layer 23 in rotary body 20 is a layer formed of an insulation resin serving as an insulator, and it isolates and separates serially between outer core 25 and inner core 26. On the other hand, dielectric layer 23 is formed of the insulation resin having a predetermined dielectric constant so that it allows a high-frequency current to flow between outer core 25 and inner core 26.

Incidentally, impedance between the shaft connected electrically to the rotary body and the stator core remains low whereas impedance between the bracket and the stator core is high with reference to the stator core, if any such dielectric layer 23 is not provided. A pulse-width modulated high-frequency and the like current generated in the stator core flow into an equivalent circuit having such impedance components. Consequently, there occurs a potential difference between an outer ring of the bearing connected electrically to the bracket and the shaft at the inner-ring side of the bearing due to the high-frequency current, and electrolytic corrosion develops in the bearing if this potential difference is high.

In this embodiment, the impedance of rotor 14 is increased to an extent of approximating it to the impedance of bracket 17 side by disposing dielectric layer 23 shown in FIG. 2 into the rotary body of low impedance formed only of the iron cores, in order to suppress development of the electrolytic corrosion. In other words, dielectric layer 23 disposed between outer core 25 and inner core 26 makes rotor 14 become equivalent to a structure having an electrostatic capacitance of dielectric layer 23 connected in series, and increases the impedance of rotor 14. Since the increase in the impedance of rotor 14 causes a large voltage drop of the high-frequency current that flows from the rotor 14 to shaft 16, it helps lower an electric potential produced in shaft 16 due to the high-frequency current. It is based on this principle that brushless motor 100 of this embodiment reduces the potential difference attributable to the high-frequency current between the outer ring of bearing 15 connected electrically to bracket 17 and shaft 16 at the inner-ring side of bearing 15. Thus achieved here is to maintain a well-balanced condition in a manner to decrease the potential difference between the inner ring and the outer ring of the bearing with keeping a condition of low electrical potentials at both ring sides of the bearing all the time, hence suppressing development of the electrolytic corrosion in the bearing.

Figure 3A:
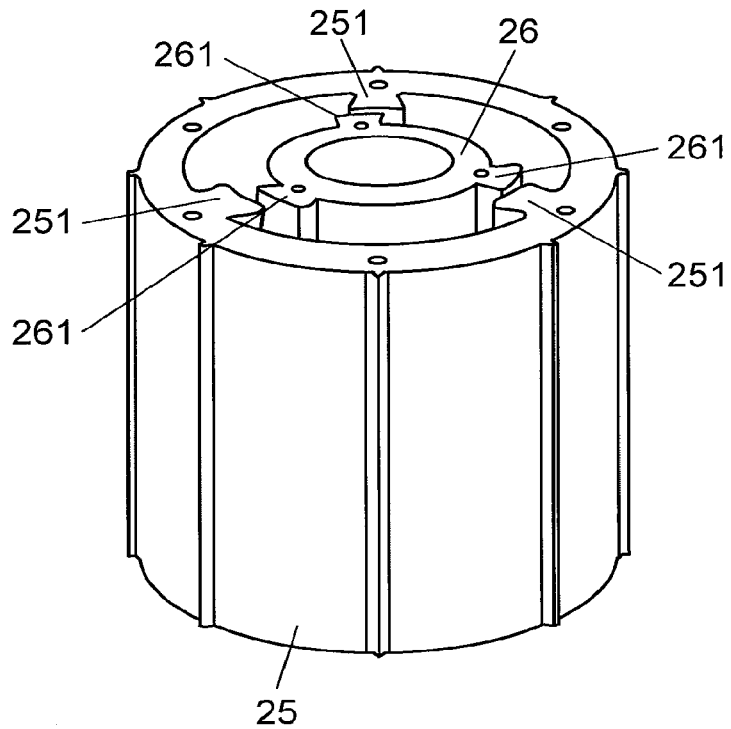
FIG. 3A is a perspective view showing positional relation of an outer core and an inner core according to the first embodiment of the present invention.
Figure 3B:
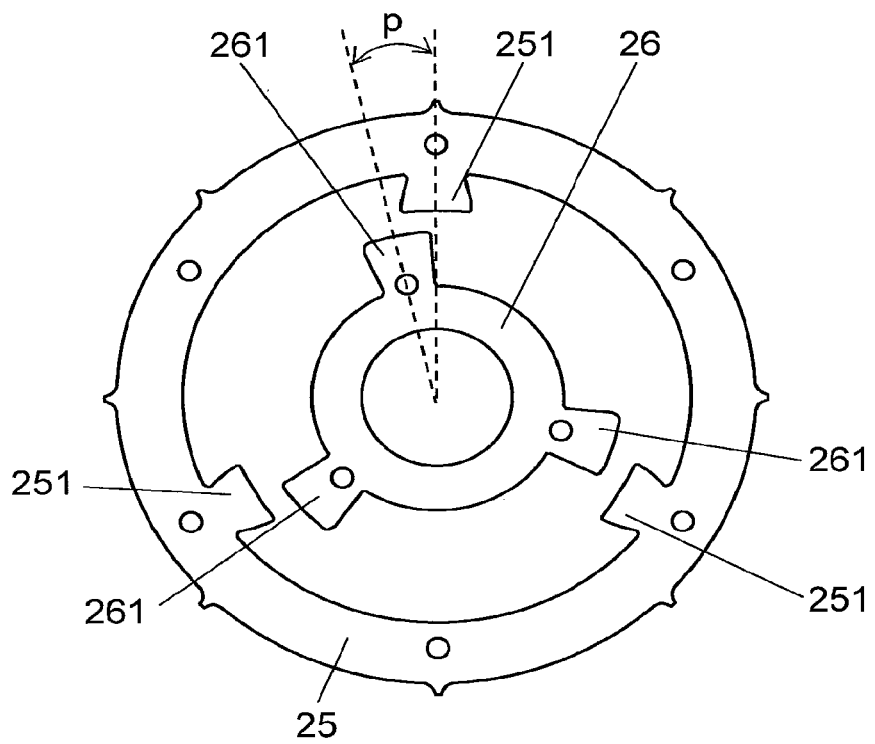
FIG. 3B is a top view showing the positional relation of the outer core and the inner core according to the first embodiment of the present invention.

Described next pertain to further details of the structure of rotary body 20. FIG. 3A is a perspective view showing a positional relation between outer core 25 and inner core 26, and FIG. 3B is a top view showing the same positional relation. As shown in FIG. 3A and FIG. 3B, outer core 25 and inner core 26 of rotary body 20 have a plurality of protruding portions in the radial direction.

Specifically, outer core 25 has generally a cylindrical shape and, to be more specific, the outer peripheral side is circularly-shaped while the inner peripheral side includes a plurality of protruding portions 251 that protrude inward from the inner surface of outer core 25. Protruding portions 251 have a shape extending thinly and linearly from a lower surface to an upper surface of outer core 25 with a predetermined width in the circumferential direction, and they protrude in this shape toward the inside from the inner surface. These protruding portions 251 are disposed individually at regular intervals along the circumferential direction. The example shown in this embodiment is provided with three protruding portions 251.

Inner core 26 also has generally a cylindrical shape and, to be more specific, it is provided with shaft insertion hole 26b in the inner peripheral side while the outer peripheral side includes a plurality of protruding portions 261 that protrude outward from the outer surface of inner core 26. Protruding portions 261 have a shape extending thinly and linearly from a lower surface to an upper surface of inner core 26 with a predetermined width in the circumferential direction, and they protrude in this shape toward the outside from the outer surface of inner core 26. These protruding portions 261 are disposed individually at regular intervals along the circumferential direction. The example shown in this embodiment is provided with three protruding portions 261.

Inner core 26 is placed inside an inner cavity of outer core 25, as shown in FIG. 3A. Dielectric layer 23 is then formed by molding an insulation resin poured into a space formed between the inner peripheral side of outer core 25 and the outer peripheral side of inner core 26. Magnet 22 of an annular shape is fitted to the outer periphery of outer core 25 to complete rotary body 20.

In rotary body 20 of this embodiment, outer core 25 and inner core 26 of the above structures are disposed into such positional relation as shown in FIG. 3A and FIG. 3B. That is, according to this embodiment, protruding portions 251 and protruding portions 261 are so arranged as not to confront each other squarely, but the end faces of protruding portions 251 are shifted in the circumferential direction with respect to their corresponding end faces of protruding portions 261. FIG. 3B shows an example in which circumferential centers of individual protruding portions 261 of inner core 26 are shifted in the direction of rotation by angle "p" with respect to the circumferential centers of the corresponding protruding portions 251 of outer core 25.

In this embodiment here, the impedance of rotor 14 is increased by the electrostatic capacitance component of dielectric layer 23 to reduce the high-frequency current that flows toward the inner ring side of bearing 15 through shaft 16, and lower the electrical potential at the inner ring side of bearing 15, as described above. It is also necessary to maintain a balance in a manner to decrease the potential difference between the inner ring and the outer ring of the bearing in order to suppress development of electrolytic corrosion more effectively. In other words, the optimum condition can be attained by properly setting the electrostatic capacitance of dielectric layer 23 so as to decrease the potential difference between the inner ring and the outer ring of the bearing, or a shaft voltage, to the lowest possible value.

In this embodiment, the end faces of protruding portions 251 and the end faces of protruding portions 261 are shifted with respect to each other in the circumferential direction to obtain the optimum condition of the shaft voltage. That is, a mutually confronting area between protruding portions 251 and protruding portions 261 can be varied and their electrostatic capacitance can be changed easily by adjusting angle "p" shown in FIG. 3B. The optimum electrostatic capacitance to bring the shaft voltage to the lowest value, or the optimum impedance of rotor 14, can be obtained by changing the electrostatic capacitance in this manner.

Described next pertains to detailed structure of disposing outer core 25 and inner core 26. First, in the structure shown in FIG. 3A and FIG. 3B, the confronting area between the end faces of protruding portions 251 and protruding portions 261 becomes the factor of determining the electrostatic capacitance since these end faces are in a positional relation close to each other. In other words, the electrostatic capacitance becomes the largest in a positional relation where the confronting area of both the end faces becomes the maximum, and the electrostatic capacitance becomes the smallest in another positional relation where both the end faces do not confront each other. The confronting area can be varied by arranging both the end faces to confront partially with respect to each other, and the electrostatic capacitance also changes according to the confronting area. Accordingly, the electrostatic capacitance can be varied easily by shifting angle "p" along the circumferential direction in a manner to change the confronting area of both the end faces. On the other hand, the electrostatic capacitance does not vary even when angle "p" is shifted in the circumferential direction under a positional relation where protruding portion 261 is situated between two adjoining protruding portions 251, for instance. In other words, outer core 25 and inner core 26 are to be so disposed that the end faces of protruding portions 251 of outer core 25 and the end faces of protruding portions 261 of inner core 26 confront partially with respect to each other. It becomes possible by virtue of this structure to increase or decrease the confronting areas, and to vary the electrostatic capacitance according to such increase or decrease. In this embodiment, the electrostatic capacitance between outer core 25 and inner core 26 is varied by using a method of setting the impedance of rotor 14 on the basis of the above principle, thereby obtaining the optimum impedance of rotor 14.

The method of setting the impedance can be applied to electric motors in the following manner to suppress development of electrolytic corrosion in the motors. That is, a plurality of samples of rotating body 20 are prepared first with their angles "p" shown in FIG. 3B shifted in increments of 1 degree, for example. These samples are mounted to representative motors of an object product, and a shaft voltage is measured on each of the samples. Finally, angle "p" of the sample that exhibits the lowest shaft voltage is applied to individual motors for the object products in the stage of production. As stated, this method of setting impedance can be applied easily to motors of every product type, and development of electrolytic corrosion can be suppressed effectively by applying this method even when the product type is changed.

Figure 4:
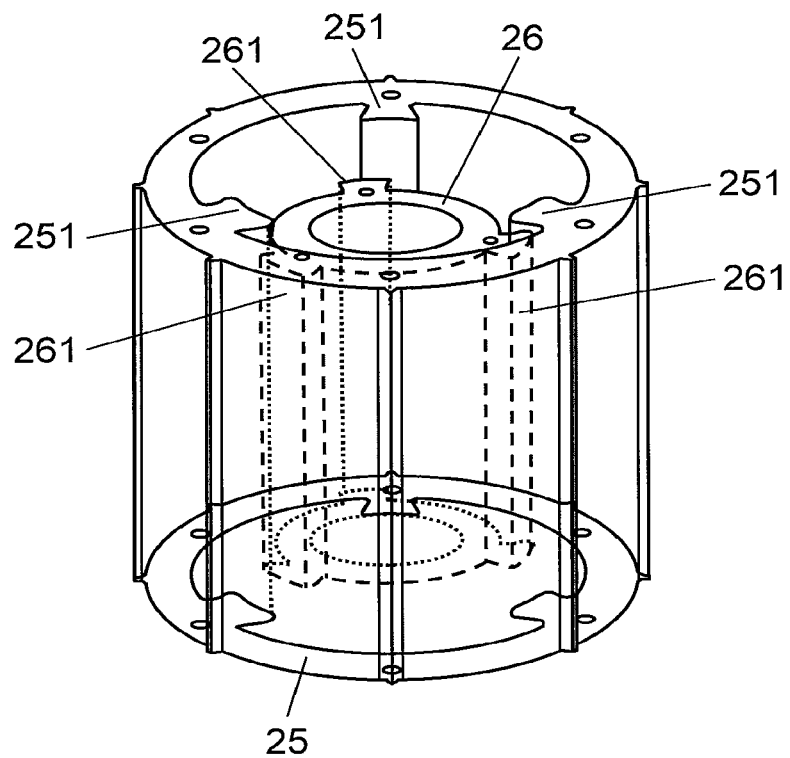
FIG. 4 is a schematic drawing showing another exemplary structure of the rotary body according to the first embodiment of the present invention.

Although what has been described above is an exemplary structure wherein both the end faces are shifted in the circumferential direction by angle "p" in order to change the confronting area of the end faces between protruding portions 251 and protruding portions 261, it may be replaced with any other structure capable of changing the confronting areas easily. For example, the electrostatic capacitance can be changed by altering the heights of outer core 25 and inner core 26 to be different from each other, which can change the confronting area of the end faces between protruding portions 251 and protruding portions 261. FIG. 4 shows an exemplary structure having outer core 25 and inner core 26 of different heights from each other. In particular, outer core 25 and inner core 26 are made of laminated steel having a plurality stacked steel sheets, so that their heights can be changed easily by changing a number of the steel sheets. In this case, it is desirable to make the height of inner core 26 smaller than the height of outer core 25 in the light of keeping the shape and size of rotary body 20 unchanged. It is also feasible to have a structure in which a rough electrostatic capacitance is determined by setting such heights, and the electrostatic capacitance is then fine-adjusted by shifting angle "p" between the end faces only slightly in the circumferential direction. In short, what is suitable is any structure that allows outer core 25 and inner core 26 to be so disposed that the end faces of protruding portions 251 of outer core 25 and the end faces of protruding portions 261 of inner core 26 confront partially with respect to each other, and makes their confronting area readily variable.

Though the description provided above is an example wherein outer core 25 and inner core 26 have plural number of protruding portions 251 and 261, they may have only one each of protruding portion 251 and protruding portion 261 respectively, since what is required is the structure capable of varying the electrostatic capacitance between outer core 25 and inner core 26. In other words, the structure can be such that outer core 25 has at least one protruding portion 251 and inner core 26 has at least one protruding portion 261.

Second Exemplary Embodiment

Figure 5:
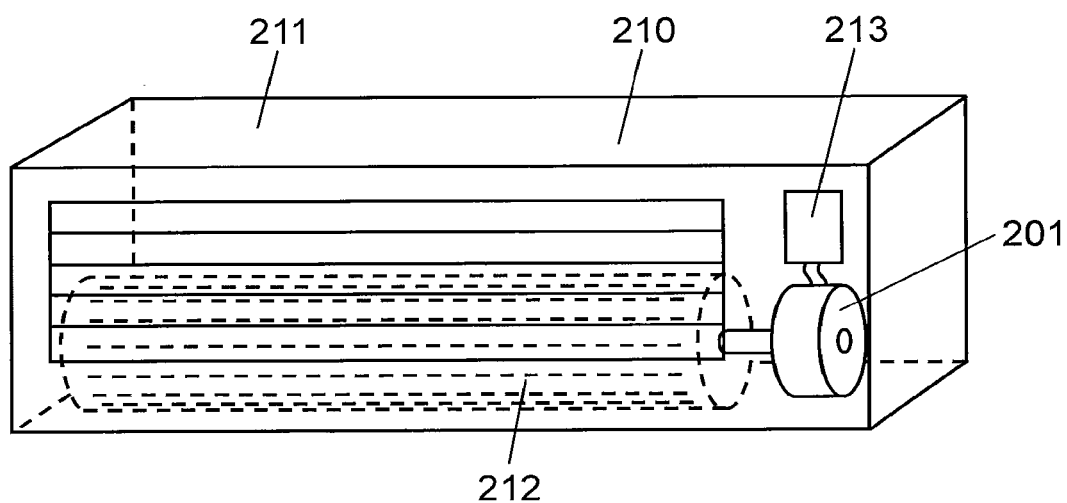
FIG. 5 is a structural drawing of an electric apparatus (an indoor unit of air conditioner) according to second exemplary embodiment of the present invention.

As an example of electric apparatus according of the present invention, description is provided in detail of a structure of an indoor unit of air conditioner as the second exemplary embodiment. In FIG. 5, motor 201 is mounted inside enclosure 211 of air conditioner's indoor unit 210. Cross-flow fan 212 is attached to a rotary shaft of motor 201. Motor 201 is driven by motor driving device 213. Motor 201 rotates when energized by motor driving device 213, and cross-flow fan 212 rotates with it. Air that is conditioned by a heat exchanger (not shown) of the indoor unit is delivered into a room by the rotation of cross-flow fan 212. Here, brushless motor 100 of the first embodiment described above, for instance, is applicable as motor 201.

In the description above, although the motor mountable to an air conditioner's outdoor unit or an indoor unit is shown as an exemplary embodiment of the electric apparatus, the present invention is also applicable to other motors that are used for various types of information technology devices, industrial equipment and the like, as a matter of course.

As described above, the motor of the present invention has a rotary body of the rotor, and the rotary body includes an outer core constituting an outer portion of the rotary body, an inner core constituting an inner portion connected to a shaft, and a dielectric layer disposed between the outer core and the inner core. The outer core has a plurality of protruding portions that protrudes inward from an inner surface thereof, and the inner core has a plurality of protruding portions that protrudes outward from an outer surface thereof, wherein the outer core and the inner core are so disposed that end faces of the protruding portions of the outer core and end faces of the protruding portions of the inner core confront partially with respect to each other. An electrostatic capacitance between the outer core and the inner core can be changed easily by virtue of the above structure, and to readily achieve the structure capable of maintaining an appropriate shaft voltage. Accordingly, the motor of the present invention can effectively suppress development of electrolytic corrosion in the bearing.

In addition, an electric apparatus of the present invention is equipped with the motor of this invention. The invention can hence provide the electric apparatus equipped with the motor capable of effectively suppressing the development of electrolytic corrosion.

INDUSTRIAL APPLICABILITY

A motor of the present invention can decrease a shaft voltage and effectively suppress development of electrolytic corrosion of a bearing. The invention is therefore useful for motors mainly mounted to such apparatuses as an indoor unit and an outdoor unit of air conditioner, for which low cost and long life of the motors are desired.

The invention claimed is:

1. A motor comprising:
a stator including a stator core wound with a winding;
a rotor including a rotary body retaining a permanent magnet in a circumferential direction confronting the stator, and a shaft connected to the rotary body in a position penetrating through the center of the rotary body;
a bearing rotatably supporting the shaft; and
a bracket,
wherein the rotary body includes an outer core constituting an outer portion of the rotary body, an inner core constituting an inner portion connected to the shaft, and a dielectric layer disposed between the outer core and the inner core,
the outer core has at least one protruding portion that protrudes inward from an inner surface thereof,
the inner core has at least one protruding portion that protrudes outward from an outer surface thereof, and
the outer core and the inner core are so disposed that an end face of the protruding portion of the outer core and an end face of the protruding portion of the inner core confront partially each other.

2. The motor of claim 1, wherein the outer core and the inner core are so disposed that a circumferential center of the protruding portion of the inner core is shifted in a circumferential direction by a predetermined angle with respect to a circumferential center of the protruding portion of the outer core.

3. The motor of claim 1, wherein a height of the inner core is smaller than a height of the outer core.

4. The motor of claim 2, wherein a height of the inner core is smaller than a height of the outer core.

5. An electric apparatus equipped with the motor defined in claim 1.

6. An electric apparatus equipped with the motor defined in claim 2.

7. An electric apparatus equipped with the motor defined in claim 3.

8. An electric apparatus equipped with the motor defined in claim 4.

* * * * *